(12) United States Patent
Kim

(10) Patent No.: US 10,544,315 B2
(45) Date of Patent: Jan. 28, 2020

(54) REVERSIBLE COLOR CHANGEABLE COATING COMPOSITION AND PREPARATION METHOD THEREOF

(71) Applicants: Tae-Woong Kim, Seoul (KR); SEB S.A., Ecully (FR)

(72) Inventor: Tae-Woong Kim, Seoul (KR)

(73) Assignee: SEB S.A., Ecully (FR)

( * ) Notice: Subject to any disclaimer, the term of this patent is extended or adjusted under 35 U.S.C. 154(b) by 429 days.

(21) Appl. No.: 15/034,270

(22) PCT Filed: Nov. 6, 2014

(86) PCT No.: PCT/KR2014/010640
§ 371 (c)(1),
(2) Date: May 4, 2016

(87) PCT Pub. No.: WO2015/069050
PCT Pub. Date: May 14, 2015

(65) Prior Publication Data
US 2016/0264790 A1 Sep. 15, 2016

(30) Foreign Application Priority Data

Nov. 7, 2013 (KR) .................. 10-2013-0134882

(51) Int. Cl.
| | | |
|---|---|---|
| *C09D 5/26* | (2006.01) | |
| *C09D 7/61* | (2018.01) | |
| *C04B 35/14* | (2006.01) | |
| *C04B 41/00* | (2006.01) | |
| *C04B 41/80* | (2006.01) | |

(52) U.S. Cl.
CPC .............. *C09D 5/26* (2013.01); *C04B 35/14* (2013.01); *C04B 41/009* (2013.01); *C04B 41/0072* (2013.01); *C04B 41/80* (2013.01); *C09D 7/61* (2018.01); *C04B 2235/3232* (2013.01); *C04B 2235/3274* (2013.01); *C04B 2235/3418* (2013.01); *C04B 2235/407* (2013.01); *C04B 2235/408* (2013.01)

(58) Field of Classification Search
CPC ... C09D 5/26; C09D 7/61; C09D 1/00; C09D 183/04; C04B 35/14; C04B 35/26; C04B 41/0072; C04B 41/009; C04B 41/80; C04B 2235/3232; C04B 235/3272; C04B 2235/3274; C04B 2235/3418; C04B 2235/407; C04B 2235/408; C04B 2235/5436; C04B 2235/5454; C08K 2003/0806; C08K 2003/085; C08K 2003/2272; C08K 2201/005; C08K 2201/014

USPC ........................................................ 252/583
See application file for complete search history.

(56) References Cited

U.S. PATENT DOCUMENTS

| | | | |
|---|---|---|---|
| 4,228,761 A | 10/1980 | Glover et al. | |
| 2010/0181322 A1 | 7/2010 | Perillon et al. | |
| 2010/0242799 A1* | 9/2010 | Kim ...................... | C09D 5/084 |
| | | | 106/287.11 |
| 2011/0095242 A1 | 4/2011 | Jin et al. | |
| 2013/0260992 A1 | 10/2013 | Nahm | |

FOREIGN PATENT DOCUMENTS

| | | | |
|---|---|---|---|
| CN | 102079921 A | 6/2011 | |
| CN | 103113766 A | 5/2013 | |
| JP | 559298 A | 3/1993 | |
| JP | 2003-206417 A | 7/2003 | |
| JP | 2010-525095 A | 7/2010 | |
| KR | 10-2012-0052326 A | 5/2012 | |
| KR | 10-1237656 B1 | 2/2013 | |
| TW | 200415204 A | 8/2004 | |
| WO | 2009017876 A1 | 2/2009 | |
| WO | 2012/018201 A2 | 2/2012 | |
| WO | WO-2012018201 A2 * | 2/2012 | ............... C09D 1/04 |

* cited by examiner

*Primary Examiner* — Ling Siu Choi
*Assistant Examiner* — Ronald Grinsted
(74) *Attorney, Agent, or Firm* — The Webb Law Firm

(57) ABSTRACT

Provided is a reversible color changeable coating composition and a preparation method thereof. The composition is coated on a plate and has heat resistance of 400° C. or higher thereby can be used for heating products very stably, and the durability of the plate increases since it has excellent wear resistance, chemical resistance and mechanical properties. In addition, beautiful colors can be obtained by mixing colors in various ways, and being heated can be identified with the naked eye since the color changes when heated.

14 Claims, 1 Drawing Sheet

REVERSIBLE COLOR CHANGEABLE COATING COMPOSITION AND PREPARATION METHOD THEREOF

CROSS-REFERENCE TO RELATED APPLICATIONS

This application is the United States national phase of International Application No. PCT/KR2014/010640 filed Nov. 6, 2014, and claims priority to Korean Patent Application No. 10-2013-0134882 filed Nov. 7, 2013, the disclosures of which are hereby incorporated in their entirety by reference.

TECHNICAL FIELD

The present invention relate to a reversible color changeable coating composition and a preparation method thereof.

BACKGROUND ART

A thermochromic pigment can be used as a reversible low temperature thermochromic paint in which colors change at a temperature of 50 to 70° C. It has a principle of a material inside a microcapsule dispersing and becoming transparent as a temperature increases, and returning to its original color by aggregation as the temperature decreases, however, the use for high-temperature range heating products or high-frequency heating has been limited since the capsule is destroyed and gas is generated when the capsule is heated to 300° C. or higher. In addition, pigments of red, yellow and orange colors, which are made of cadmium, have a property of their color changing to black at 150 to 200° C., however, the use for cooking container interiors has been limited due to the toxic properties of heavy metals.

Meanwhile, Korean Patent Application Laid-Open Publication No. 10-2012-0052326 discloses a reversible thermochromic water-based ink composition made of an organic nitrogen sulfur compound and an aqueous resin, wherein the organic nitrogen sulfur compound is at least one type of compounds selected from the group consisting of 2-(4-thiazoyl)-benzimidazole, 2-(thiocyanatemethylthio)-1,3-benzothiazole, 2-methyl-4-isothiazolin-3-one and 5-chloro-2-methyl-4-isothiazolin-3-one. However, the invention does not disclose a temperature-sensitive plate, which is described in the present invention.

As a result, in order to remedy the shortcomings and problems of existing technologies, the present inventors invented a reversible thermochromic ceramic coating agent in which colors change depending on temperatures by absorbing (absorption and radiation are equivalent) all the light from a near infrared region, and which has heat resistance of 400° C. or higher and durability.

An object of the present invention is to provide a reversible color changeable coating composition and a preparation method thereof by grinding a silica sol, $Fe_2O_3$ or additional compounds as a pigment and filler using a ball mill in order to prepare a reversible thermochromatic ceramic coating agent in which colors change from a low temperature around 100° C., and which has heat resistance of 400° C. or higher and durability.

In addition, another object of the present invention is to provide a plate that comprises the composition and a method for changing colors using this plate.

SUMMARY OF THE INVENTION

Various specific embodiments described in the present invention are described with reference to the accompanying drawings. In the following description, various specific details such as specific forms, compositions, processes and the like are described in order to completely understand the present invention. However, certain specific embodiments can be performed without one or more of these specific details or with other well-known methods and forms. In other examples, well-known processes and manufacturing technologies are not described as specific details in order not to unnecessarily obscure the present invention. Referencing on "one specific embodiment" through the whole present specification means particular characteristics, forms, compositions or properties described associating with a specific embodiment being comprised in one or more specific embodiments of the present invention. Therefore, the conditions of the expression "in one specific embodiment" or "specific embodiment" in various locations throughout the present specification do not always represent identical specific embodiments of the present invention. In addition, particular characteristics, forms, compositions or properties may be combined using certain proper methods in one or more specific embodiments.

One specific embodiment of the present invention provides a method for preparing a reversible color changeable coating composition, which comprises the steps of grinding a silica sol in 200 to 400 parts by weight, an alcohol in 100 to 300 parts by weight, and $Fe_2O_3$ in 100 to 300 parts by weight as a pigment and filler for the total weight of the coating composition using a ball mill; and adding a curing agent in 200 to 300 parts by weight to the grinded substance. In the specific embodiment, a method for preparing a reversible color changeable coating composition in which the step of grinding comprises ball milling with further adding metal powder is provided, a method for preparing a reversible color changeable coating composition in which the metal powder comprises any one or more selected from the group consisting of Ag, Cu and Al is provided, a method for preparing a reversible color changeable coating composition in which the metal powder is added in 0.1 to 10 parts by weight is provided, a method for preparing a reversible color changeable coating composition in which the pigment and filler further comprises any one or more selected from the group consisting of Cd-Red, Cd-Yellow, Ti, Si, Al, Zr, Fe, Mn, Co and Cr; or oxides thereof is provided, and a method for preparing a reversible color changeable coating composition in which, in the pigment and filler, the weight of $Fe_2O_3$ is 20% to 90% of the total weight of the pigment and filler is provided.

One specific embodiment of the present invention provides a reversible color changeable coating composition stirred and matured after adding a curing agent in 200 to 300 parts by weight to a grinded substance of a silica sol in 200 to 400 parts by weight, an alcohol in 100 to 300 parts by weight, and $Fe_2O_3$ in 100 to 300 parts by weight as a pigment and filler for the total weight of the coating composition. In the specific embodiment, a reversible color changeable coating composition in which the grinded substance additionally comprises metal powder is provided, a reversible color changeable coating composition in which the metal powder comprises any one or more selected from the group consisting of Ag, Cu and Al is provided, a reversible color changeable coating composition in which the metal powder is 0.1 to 10 parts by weight is provided, a reversible color changeable coating composition in which the pigment and filler further comprises any one or more selected from the group consisting of Cd-Red, Cd-Yellow, Ti, Si, Al, Zr, Fe, Mn, Co and Cr; or oxides thereof is provided, and a reversible color changeable coating composition in which, in the pigment and filler, the weight of $Fe_2O_3$ is 20% to 90% of the total weight of the pigment and filler is provided.

In one specific embodiment of the present invention, a reversible color changeable plate, in which a target area is coated with the coating composition and calcined, is provided. In addition, in one specific embodiment of the present invention, a method for preparing a reversible color changeable plate, which comprises the steps of coating the target area of a plate with the coating composition; and baking the coated plate, is provided.

In one specific embodiment of the present invention, a method for changing the color of a coated area by heating a reversible color changeable plate, in which a target area is coated with the coating composition and calcined, to a target temperature is provided.

In one specific embodiment of the present invention, the reversible color changeable coating composition means a coatable composition showing a phenomenon in which the color changes depending on energy variations or temperature changes, and the color reversibly changes back to the original color when the energy is removed again or the temperature returns to the original temperature.

In one specific embodiment of the present invention, the reversible color changeable plate is a plate coated with the reversible color changeable coating composition, and although not limited thereto, the plate comprises a metal plate such as iron, copper and aluminum, a non-metal plate and a ceramic plate, and means a plate in which the reversible color changeable coating composition is coated thereto and calcined. Such a plate can be used in various areas such as cooking containers, stoves, electrical appliances and constructions.

In one specific embodiment of the present invention, the metal powder refers to but is not limited to a metal such as Ag, Cu and Al in a particle size of 5 µm or less, or a combination thereof.

In one specific embodiment of the present invention, a silica sol in a particle size of 10 to 50 nm is used, and an aliphatic alcohol is used as the alcohol, silane may be used as the curing agent, and $Fe_2O_3$ or Cd may be used as the pigment. In addition, in one specific embodiment of the present invention, a mixture of one or more types of an oxide such as Ti, Al, Si, Zr, Co, Mn and Cr and a non-oxide such as AlN, $Si_3N_4$, BN and SiC may be used as the pigment and filler.

In one specific embodiment of the present invention, there is provided a method for preparing a hot place for kitchen use, which comprises the steps of coating the coating composition of the present invention on a hot place for kitchen use and then baking the coated plate at a temperature of 100 to 350° C.; coating the letters, patterns or a part on the reversible color changeable coating layer of the calcined hot plate by changing pigment ingredients or colors using methods of spray, pad, silk printing and the like; and then baking the plate at a temperature of 100 to 350° C. after further coating with a TOP coating agent in non-stick function.

The plate of the present invention has heat resistance of 400° C. or higher thereby can be used for heating products very stably, and the durability of the plate increases since it has excellent wear resistance, chemical resistance and mechanical properties. In addition, beautiful colors can be obtained by mixing colors in various ways, and being heated can be identified with the naked eye since the color changes when heated.

BRIEF DESCRIPTION OF THE DRAWINGS

The drawings show color changes depending on temperatures when a reversible color changeable coating composition in one specific embodiment of the present invention is coated on a target area of a plate and is calcined, wherein.

DETAILED DESCRIPTION OF THE INVENTION

Figure 1A:
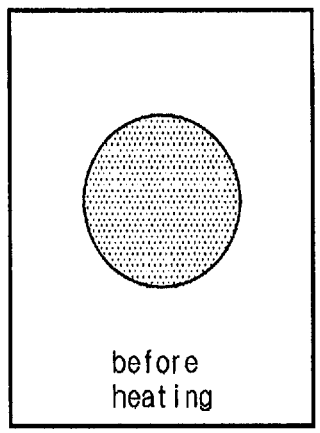
FIG. 1A depicts the target area before heating and FIG. 1B depicts the target after heating.
Figure 1B:
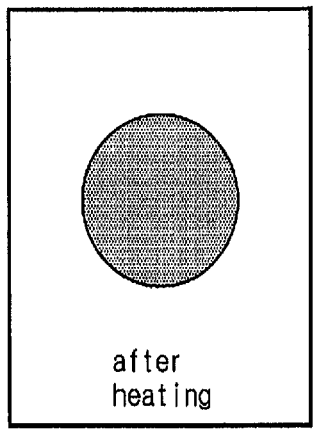

The best mode of the present invention provides a method for preparing a reversible color changeable coating composition, which comprises the steps of grinding a silica sol in 200 to 400 parts by weight, an alcohol in 100 to 300 parts by weight, and $Fe_2O_3$ in 100 to 300 parts by weight as a pigment and filler for the total weight of the coating composition using a ball mill; and adding a curing agent in 200 to 300 parts by weight to the grinded substance. In the specific embodiment, a method for preparing a reversible color changeable coating composition in which the step of grinding comprises ball milling with further adding metal powder is provided, a method for preparing a reversible color changeable coating composition in which the metal powder comprises any one or more selected from the group consisting of Ag, Cu and Al is provided, a method for preparing a reversible color changeable coating composition in which the metal powder is added in 0.1 to 10 parts by weight is provided, a method for preparing a reversible color changeable coating composition in which the pigment and filler further comprises any one or more selected from the group consisting of Cd-Red, Cd-Yellow, Ti, Si, Al, Zr, Fe, Mn, Co and Cr; or oxides thereof is provided, and a method for preparing a reversible color changeable coating composition in which, in the pigment and filler, the weight of $Fe_2O_3$ is 20% to 90% of the total weight of the pigment and filler is provided.

Hereinafter, the constitutions and technological characteristics of the present invention are described in more detail with reference to the following examples. However, the following examples are for illustrative purposes only, and the scope of the present invention is not limited thereto.

Example 1

Preparation of Plate Comprising Reversible Thermochromic Ceramic Coating Layer

Experiment 1

A grinded substance in a liquid state was obtained by adding 300 g of a silica sol in a particle size of 10 to 50 nm (water content-210 g), 200 g of isopropyl alcohol (IPA), 200 g of $Fe_2O_3$ as a pigment and filler, 1 g of silver powder and 4 g of copper powder in a size of 2 µm as an additive to a ball mill and grinding them at a rate of 100 rpm for approximately 5 hours. 1 kg of a coating agent was obtained by adding 250 g of methyltrimethoxysilane (MTMS) to the grinded substance in a liquid state as a curing agent, and stirring and maturing the mixture for approximately 8 hours.

An aluminum plate in a size of 100×70×3 mm was sand treated using a 80# emery, was washed clean, was spray coated using the coating agent, and then was calcined for approximately 30 minutes at a temperature of 250° C. in a furnace, and as a result, a plate in a film thickness of 35 µm was completed.

Experiment 2

The coating agent and the plate were prepared using the same method as in Experiment 1. However, $Fe_2O_3$ and $TiO_2$ in a total weight of 200 g were used in a weight ratio of 1:1 as the pigment and filler.

Experiment 3

The coating agent and the plate were prepared using the same method as in Experiment 1. However, $Fe_2O_3$ and Cd-Red pigment in a total weight of 200 g were used in a weight ratio of 1:1 as the pigment and filler.

Experiment 4

The coating agent and the plate were prepared using the same method as in Experiment 1. However, $Fe_2O_3$, Cd-Red and Co in a total weight of 200 g were used in a weight ratio of 1:1:2 as the pigment and filler.

Controls 1 and 2

The coating agent and the plate were prepared using the same method as in Experiment 1. However, $Fe_3O_4$ or Co in a total weight of 200 g was used as the pigment and filler. The summaries thereof are shown in the following Table 1.

TABLE 1

|  | Ingredients | Mixing Ratio |
| --- | --- | --- |
| Control 1 | $Fe_3O_4$ | 1 |
| Control 2 | Co | 1 |
| Experiment 1 | $Fe_2O_3$ | 1 |
| Experiment 2 | $Fe_2O_3$:$TiO_2$ | 1:1 |
| Experiment 3 | $Fe_2O_3$:CdRed | 1:1 |
| Experiment 4 | $Fe_2O_3$:CdRed:Co | 1:1:2 |

Example 2

Identification of Color Changes of Plate Comprising Reversible Thermochromic Ceramic Coating Layer when Heated The plates of Controls 1 and 2 and Experiments 1 to 4 in Example 1 were heated to 90° C. to 150° C. As shown in the following Table 2, it was observed that color changes occurred at certain temperatures in Experiments 1 to 4, and the colors reversibly returned to their original colors after cooling.

TABLE 2

|  | Original Color | Color Change Starting Temperature | Color After Heating | Color After Cooling |
| --- | --- | --- | --- | --- |
| Control 1 | Black | N/A | Black | Black |
| Control 2 | Blue | N/A | Blue | Blue |
| Experiment 1 | Cherry | 95 C. | Black Coffee | Cherry |
| Experiment 2 | Red Bean | 100 C. | Grey | Red Bean |
| Experiment 3 | Red | 110 C. | Black Coffee | Red |
| Experiment 4 | Black Red | 120 C. | Black Purple | Black Red |

Example 3

Variations in Color Changing Temperatures Depending on Metal Addition

The coating agent and the plate were prepared using the same method as in Experiment 1 of Example 1. However, silver and copper powders were not added (Control 3), and when 0.1 or 10 g of silver or copper, which has excellent thermal conductivity, was added (Experiments 5 and 6), it was seen that the color change starting temperature dropped 10° C. to 20° C. as shown in the following Table 3.

TABLE 3

|  | Original Color | Color Change Starting Temperature | Color After Heating | Color After Cooling |
| --- | --- | --- | --- | --- |
| Control 3 | Cherry | 115 C. | Black Coffee | Cherry |
| Experiment 5 | Cherry | 100 C. | Black Coffee | Cherry |
| Experiment 6 | Cherry | 95 C. | Black Coffee | Cherry |

While the present invention has been described for specific embodiments, it will be apparent to those skilled in the art that various changes may be made without departing from the scope of the present invention, and its components can be substituted with equivalents. In addition, various modifications may be made without departing from the fundamental scope of the invention, and specific conditions and materials may be employed as teaching contents of the present invention. Therefore, the present invention is not limited to particular embodiments that are delivered as the best mode planned to carry out the present invention, and the present invention needs to be interpreted to comprise all the embodiments defined in the attached claims.

The plate of the present invention has heat resistance of 400° C. or higher thereby can be used for heating products very stably, and the durability of the plate increases since it has excellent wear resistance, chemical resistance and mechanical properties.

The invention claimed is:

1. A method for preparing a reversible color changeable coating composition comprising the steps of: preparing a grinded substance with a ball mill by grinding a silica sol in 200 to 400 parts by weight, an alcohol in 100 to 300 parts by weight, and $Fe_2O_3$ in 100 to 300 parts by weight as a pigment and filler for the total weight of the coating composition; and adding a curing agent in 200 to 300 parts by weight to the grinded substance,
  wherein, in the step of grinding, a ball mill is performed with further adding metal powder, and
  wherein the metal powder comprises any one or more selected from the group consisting of Ag, Cu and Al.

2. The method for preparing a reversible color changeable coating composition according to claim 1, wherein the metal powder is added in 0.1 to 10 parts by weight.

3. The method for preparing a reversible color changeable coating composition according to claim 1, wherein the pigment and filler further comprises any one or more selected from the group consisting of Cd-Red, Cd-Yellow, Ti, Si, Al, Zr, Fe, Mn, Co and Cr; or oxides thereof.

4. The method for preparing a reversible color changeable coating composition according to claim 1, wherein, in the pigment and filler, $Fe_2O_3$ is 20% to 90% of the total weight of the pigment and filler.

5. A reversible color changeable coating composition, which is stirred after adding a curing agent in 200 to 300 parts by weight to a grinded substance of a silica sol in 200 to 400 parts by weight, an alcohol in 100 to 300 parts by weight, and $Fe_2O_3$ in 100 to 300 parts by weight as a pigment and filler for the total weight of the coating composition,
wherein the grinded substance further comprises metal powder, and
wherein the metal powder comprises any one or more selected from the group consisting of Ag, Cu and Al.

6. The reversible color changeable coating composition according to claim 5, wherein the metal powder is 0.1 to 10 parts by weight.

7. The reversible color changeable coating composition according to claim 5, wherein the pigment and filler further comprises any one or more selected from the group consisting of Cd-Red, Cd-Yellow, Ti, Si, Al, Zr, Fe, Mn, Co and Cr; or oxides thereof.

8. The reversible color changeable coating composition according to claim 7, wherein, in the pigment and filler, $Fe_2O_3$ is 20% to 90% of the total weight of the pigment and filler.

9. A reversible color changeable plate, in which a target area is coated with the coating composition of claim 5 and calcined.

10. A method for preparing a reversible color changeable plate, comprising the steps of: coating a target area of a plate with the coating composition of claim 5 and baking the coated plate.

11. A method for changing the color of a coated area by heating a reversible color changeable plate, in which a target area is coated with the coating composition of claim 5 and calcined, to a target temperature.

12. A reversible color changeable plate, in which a target area is coated with the coating composition of claim 6 and calcined.

13. A reversible color changeable plate, in which a target area is coated with the coating composition of claim 7 and calcined.

14. A reversible color changeable plate, in which a target area is coated with the coating composition of claim 8 and calcined.

* * * * *